2,892,672

INHIBITION OF GAS FADING IN COLORED CELLULOSE TRIACETATE

Anthony B. Conciatori, Chatham, Fred Fortess, Summit, and Leonard J. Rosen, East Orange, N.J., assignors to Celanese Corporation of America, New York, N.Y., a corporation of Delaware No Drawing. Application February 16, 1955
Serial No. 488,718

3 Claims. (Cl. 8—61)

This invention relates to cellulose derivatives and relates more particularly to the inhibition of gas fading in colored organic derivative of cellulose textile materials.

When certain dyestuffs are used for the coloration of organic derivative of cellulose textile material and the colored materials are exposed to acid fumes, such as, for example, the products of combustion of coal, gas, etc., there is often observed a change in the shade of the colored materials. This change in shade, usually referred to as "gas fading," may be merely a dulling or it may be definite change in color. Gas fading is frequently observed in dyeings on organic derivative of cellulose materials with certain blue anthraquinone dyestuffs, e.g. 1,4-diethylamino-5,8-dihydroxy anthraquinone, 1-amino-4-diethylamino-5,8-dihydroxy anthraquinone, 1-amino-4-anilino anthraquinone, 1,4-dimethylamino anthraquinone or 1-beta-hydroxyethylamino-4-methylamino anthraquinone. When fabrics of organic derivatives of cellulose dyed with these dyestuffs are exposed to acid fumes the colors change from a pure blue shade to one having a reddish cast. On continued exposure to the acid fumes the blue color may even change to pink.

It is an important object of this invention to provide textile materials which will be free from the foregoing and other disadvantages.

Another object of this invention is the provision of colored textile materials of greatly improved resistance to gas fading.

Other objects of this invention will be apparent from the following detailed description and claims.

In accordance with this invention a small proportion of a polymer of a polymerizable ethylenically unsaturated compound containing a pyridine group is incorporated into a textile material having a basis of a cellulose ester of a lower aliphatic acid, said cellulose ester having a very low hydroxyl content, to improve the resistance of the material to gas fading when the material is colored.

Examples of suitable polymers containing pyridine groups are the polymers, preferably the resinous polymers, of such vinyl or vinylidene compounds as 2-vinyl pyridine, 4-vinyl pyridine, 2-methyl-5-vinyl pyridine, 2-vinyl-5-methyl pyridine, 2-vinyl-5-ethyl pyridine and 2-ethyl-5-vinyl pyridine. Copolymers of such pyridine compounds and other ethylenically unsaturated monomers, e.g. styrene or methyl methacrylate, may also be used if desired. Such copolymers preferably contain a major proportion of the pyridine compound. It is preferred that the polymer be of the soluble, fusible type.

In the practice of the present invention outstanding results have been obtained by the use of textile materials having a basis of cellulose acetate of very high acetyl value, e.g. cellulose acetates having acetyl values of at least 59%, preferably 61% to 62.5%, calculated as combined acetic acid. These acetyl values correspond to not more than 0.29, preferably 0.13 to zero, alcoholic hydroxyl groups per anhydroglucose unit in the cellulose molecules of said esters. Other cellulose esters of very low hydroxyl content may be employed in place of, or in addition to, the aforesaid cellulose acetate. Examples of such other cellulose esters are the propionate, butyrate, mixed acetate-propionate, mixed acetate-butyrate and the mixed acetate-formate esters of cellulose.

The proportions of the polymer containing pyridine groups incorporated into the cellulose ester of very low hydroxyl content are not more than about 6%, preferably in the range of 2 to 4%. In these proportions such polymers are generally compatible with such cellulose esters. Higher proportions undesirably increase the affinity of the cellulose ester material for acid dyes thus making it difficult to obtain cross-dyed effects in fabrics comprising the cellulose ester and an animal fiber, such as wool. Higher proportions also undesirably increase the retentivity of the cellulose ester material for chlorine on bleaching and increase the tendency of the material to discolor on heat treatment.

The polymer containing pyridine groups may be incorporated into the cellulose ester of low hydroxyl content in any suitable manner before, during or after the dyeing thereof. Preferably, it is incorporated into the cellulose ester before the latter is formed into filaments. To this end the polymer may be added to the spinning dope, e.g. to a solution of the cellulose ester in a methylene chloride-containing solvent, for example a mixture of methylene chloride and a lower alkanol such as methanol, ethanol, propanol, isopropanol, or butanol or mixtures thereof. However, the polymer may be applied, in the form of a solution or an aqueous dispersion thereof, to preformed filamentary material of a cellulose ester of low hydroxyl content.

The dyeing of the textile material may be carried out in a manner well known to the art, preferably by applying one or more dyestuffs of the type known as dispersed cellulose acetate dyestuffs. Thus, the material may be immersed in a heated aqueous bath having a temperature of, for example, 60 to 95° C. and containing one or more dispersed cellulose acetate dyestuffs together with a dispersing agent therefor, such as sodium lignosulfonate, sulfonated naphthalene-formaldehyde condensation product or soap. Practically any desired hue may be imparted to the material by the use of appropriate mixtures of dyestuffs, for example by using mixtures of varying amounts of red, blue and yellow dyestuffs. The rate of dyeing may be increased by carrying out the dyeing process in the presence of a suitable dyeing assistant, e.g. pine oil, tripropyl phosphate, tributyl phosphate, diethyl phthalate, or an N,N-dihydroxyethyl fatty acid amide, such as N,N-dihydroxyethyl capramide. Such dyeing assistants may be applied to the material, as by padding, before dyeing or may be added to the dyebath. As stated, the polymer containing pyridine groups, previously described, may be applied to the textile material during the dyeing thereof. To this end the polymer may be dispersed in the aqueous dyebath if desired.

After dyeing, the textile material containing the aforesaid nitrogeneous polymer incorporated therein is subjected to a heat treatment. This heat treatment is advantageously carried out at a temperature of at least about 190° C., preferably about 210 to 240° C. Suitable conditions of heat treatment are, for example, 235° C. for 10 seconds or 215° C. for 30 seconds. The textile material may be heated in any desired manner, e.g. by exposure to hot air, or to infra red radiation, by immersion in molten metal, by dielectric heating, by passing over heated rolls or other heated surfaces, or by exposure to steam. It is found that the heat treatment further improves the resistance to gas fading of the dyed textile material.

In some cases the mixture of the cellulose ester and the polymer containing pyridine groups is milky in appearance. This milkiness disappears on heat treatment in accordance with this invention.

The heat treatment also effects an improvement in other properties of the textile material of this invention. Thus, it raises the safe ironing point of the textile material by more than 20° C., e.g. from 180° C. to 230–240° C., and improves the resistance of the textile material to creasing, to glazing and to shrinkage on steam pressing. It improves the wash-fastness of the dyed textile material, as well as the ability of the textile material to be permanently pleated.

It will be understood that the textile materials of this invention may be left undyed if desired. Also, the textile materials may be dyed in selected areas only. In such cases there is a slight tendency for the polymer-containing textile materials of this invention to show discoloration in the undyed portions on heat treatment. Such discoloration is easily removed, as by bleaching under substantially neutral or alkaline conditions, e.g. in the pH range of about 7 to 9 or 10, as with sodium or calcium hypochlorite, sodium chlorite or peracetic acid. When peracetic acid is used it is preferably neutralized, as with sodium hydroxide. After the bleaching treatment and rinsing the textile material may be subjected to further heating, such as that which takes place when a fabric made of this textile material is ironed at a temperature of 200 to 230° C., without the danger of the material rediscoloring.

The bleaching treatment described above may also be applied to the textile material before any heat treatment and discoloration thereof. In this case the bleaching substantially prevents the discoloration of the material on heat treatment. In fact, bleaching before heat treatment is generally more effective than bleaching after heat treatment.

The following examples are given to illustrate this invention further. All proportions are by weight unless otherwise indicated.

*Example I*

A polymer of 2-vinyl-5-methyl pyridine (said polymer having an inherent viscosity of 0.48–0.53 at 25° C. in 90/10 methylene chloride/ethanol at a concentration of 0.1 g. polymer per 100 ml. polymer solution) is incorporated into a spinning solution comprising cellulose acetate of acetyl value 61% calculated as combined acetic acid, dissolved in a mixture of 90% of methylene chloride and 10% of methyl alcohol. The amount of the polymer added is 3%, based on the weight of the cellulose ester. The resulting solution is spun into the form of filaments which are then woven into a fabric. The fabric is dyed, at a temperature of 95° C., in 100 times its weight of an aqueous dyebath comprising 3% of 1-beta-hydroxyethyl-amino-4-methylamino anthraquinone and 10% of soap, both percentages being based on the weight of the fabric. The dyed fabric is then scoured and dried, following which it is subjected to a temperature of 240° C. for 15 seconds in radiant heat oven.

The heat-treated fabric is subjected to two units of exposure to gas fading conditions in a fume chamber according to the test procedure established by the American Association of Textile Chemists and Colorists. There is only a slight change in the color of the fabric, comparison with the original unfaded fabric indicating a shade change rating corresponding to 3–4 on the International Gray Scale.

The same fading tests are applied to otherwise identical fabrics made of yarns of cellulose acetate of the same acetyl value dyed under the same conditions as given above, with the following results: A dyed fabric containing none of the polyvinyl methyl pyridine shows a shade change rating of only 1–2 even after only one unit of exposure to fading, and 1 after two units, regardless of whether the fabric has or has not been subjected to a heat treatment. A dyed fabric containing 3% of the aforesaid polymer, which fabric has not been heat-treated, shows a shade change rating of 3 after one unit of exposure and 2–3 after two units. For a dyed fabric containing 3% of diphenylacetamidine, which fabric has been heat treated, the ratings for change of shade after one and two units of exposure are 1 in both instances, whereas before the heat treatment they are 2–3 and 1–2 respectively on the International Gray Scale. The diphenylacetamidine mentioned above is a well known inhibitor for the gas fading of dyed cellulose acetate of 53 to 55% acetyl value.

*Example II*

Example I is repeated except that the dyebath contains in addition 0.4 part of emulsified tri-n-butyl phosphate which acts as an assistant to increase the rate of dyeing. The results are similar to those obtained in Example I.

*Example III*

Example I is repeated except that a polymer of 2-vinyl-5-ethyl pyridine is used in place of the polymer of 2-vinyl-5-methyl pyridine. The results are substantially the same as those set forth in Example I. However, when the dyed fabrics of this example and of Example I are tested for fading on exposure to ozone the dyed fabric of this example shows superior fading-resistance.

*Example IV*

A portion of the fabric produced in Example I, before the dyeing and the heat treatment thereof, is treated by immersion for one hour at room temperature in an aqueous solution containing 20 grams per liter of sodium hypochlorite (11% available chlorine) and having a pH of 9 to 10. Thereafter the fabric is treated with an aqueous antichlor solution of sodium bisulfite for ½ hour at 60° C. The fabric is then rinsed and heat-treated at a temperature of 230° C. for 30 seconds. No discoloration of the fabric is observed.

*Example V*

A portion of the fabric produced in Example I, before the dyeing and the heat treatment thereof, is treated by immersion for one hour in an aqueous solution containing 4.5 grams per liter of peracetic acid, 0.6 gram per liter of the sodium hexametaphosphate known as "Calgon" and sufficient sodium hydroxide to bring the pH to about 7, at a temperature of 95° C. The fabric is then rinsed in water and heat treated as in Example IV. No discoloration of the fabric is observed.

It is to be understood that the foregoing detailed description is merely given by way of illustration and that many variations may be made therein without departing from the spirit of my invention.

Having described our invention, what we desire to secure by Letters Patent is:

1. Process which comprises heating a dyed cellulose ester textile material to improve the resistance of said dyed material to gas fading, said textile material comprising yarns of a blend of cellulose acetate having an acetyl value of at least 61%, calculated as combined acetic acid, and as an inhibitor of gas fading, up to 6% of a polymer of an ethylenically unsaturated compound containing a pyridine group wherein the ethylenic unsaturation is attached to said pyridine group through a carbon atom of said pyridine group, the temperature of said heating being at least about 190° C., said heating being carried out for a period sufficient to raise the safe ironing point of the textile material by more than 20° C., said blend being one produced by spinning a solution containing dissolved therein said cellulose acetate and said polymer.

2. Process as set forth in claim 1 in which said polymer is polyvinyl methyl pyridine.

3. Process as set forth in claim 1 in which said polymer is polyvinyl ethyl pyridine.

References Cited in the file of this patent

UNITED STATES PATENTS

| | | |
|---|---|---|
| 2,083,122 | Olpin | June 8, 1937 |
| 2,142,007 | Schlack | Dec. 27, 1938 |
| 2,156,069 | Schlack | Apr. 25, 1939 |
| 2,168,348 | Izard | Aug. 8, 1939 |
| 2,211,861 | Platt | Aug. 20, 1940 |
| 2,564,726 | Saner | Aug. 21, 1951 |
| 2,702,763 | Pritchard | Feb. 22, 1955 |

FOREIGN PATENTS

| | | |
|---|---|---|
| 613,818 | Great Britain | Dec. 3, 1948 |
| 508,676 | Canada | Dec. 28, 1954 |
| 865,298 | Germany | Feb. 2, 1953 |
| 613,817 | Great Britain | Dec. 3, 1948 |